US009221433B2

(12) United States Patent
Dunlap (10) Patent No.: US 9,221,433 B2
(45) Date of Patent: Dec. 29, 2015

(54) SAFETY BRAKING SYSTEM FOR A HAND-PUSHED ROLLATOR

(76) Inventor: Thomas F. Dunlap, West Linn, OR (US)

( * ) Notice: Subject to any disclaimer, the term of this patent is extended or adjusted under 35 U.S.C. 154(b) by 742 days.

(21) Appl. No.: 13/274,209

(22) Filed: Oct. 14, 2011

(65) Prior Publication Data

US 2012/0090926 A1   Apr. 19, 2012

Related U.S. Application Data

(60) Provisional application No. 61/393,973, filed on Oct. 18, 2010, provisional application No. 61/513,940, filed on Aug. 1, 2011.

(51) Int. Cl.
| | |
|---|---|
| *B60T 1/00* | (2006.01) |
| *A61H 3/04* | (2006.01) |
| *B60T 1/04* | (2006.01) |
| *B60T 1/06* | (2006.01) |
| *B60T 7/10* | (2006.01) |
| *B60T 11/04* | (2006.01) |
| *F16D 63/00* | (2006.01) |

(52) U.S. Cl.
CPC . *B60T 1/005* (2013.01); *A61H 3/04* (2013.01); *B60T 1/04* (2013.01); *B60T 1/06* (2013.01); *B60T 7/104* (2013.01); *B60T 11/046* (2013.01); *F16D 63/006* (2013.01); *A61H 2003/046* (2013.01)

(58) Field of Classification Search
CPC ...... A61H 3/04; A61H 2003/046; B60T 1/04; B60T 1/06; B60T 1/005; B60T 11/046; B60T 7/104; F16D 63/006
USPC ................ 188/19, 20, 9, 68, 69, 2 F, 2 D, 31, 188/24.11, 24.13, 24.21, 24.22, 1.12, 29, 188/106 P; 74/502.2, 488, 489
See application file for complete search history.

(56) References Cited

U.S. PATENT DOCUMENTS

| | | | |
|---|---|---|---|
| 4,322,093 A | 3/1982 | Otto | |
| 4,384,713 A | 5/1983 | Deutsch et al. | |
| 4,384,714 A | 5/1983 | Kimura | |
| 5,927,441 A * | 7/1999 | Luo | 188/19 |
| 6,079,290 A * | 6/2000 | Li | 74/502.2 |
| 6,216,825 B1 * | 4/2001 | Hung | 188/24.22 |
| 6,338,355 B1 * | 1/2002 | Cheng | 135/67 |
| 6,817,451 B1 * | 11/2004 | Chen | 188/20 |
| 6,877,519 B2 * | 4/2005 | Fink | 135/67 |
| 7,370,734 B2 * | 5/2008 | Hallgrimsson | 188/31 |
| 7,370,870 B2 * | 5/2008 | Andersson et al. | 280/87.05 |
| 2005/0006185 A1 * | 1/2005 | Kassai et al. | 188/19 |
| 2005/0217409 A1 * | 10/2005 | Andersson et al. | 74/502.2 |
| 2007/0164528 A1 * | 7/2007 | Morath | 280/87.05 |

FOREIGN PATENT DOCUMENTS

JP   2006109877   4/2006

* cited by examiner

*Primary Examiner* — Robert A Siconolfi
*Assistant Examiner* — Charles Poon (57) ABSTRACT

The present invention is a safety braking system for a hand-pushed rollator, which allows the user to engage different operation modes: a park mode, a walk mode, and a brake mode. The present invention comprises a wheel mechanism, a cable assembly, and a handlebar mechanism. The wheel mechanism allows a wheel to rotate during walk mode, to engage the wheel with a parking brake during park mode, and to engage the wheel with a friction brake during brake mode. The wheel mechanism pivots the parking brake and the friction brake on a lever in order to switch between the different operation modes. The handlebar mechanism allows the user to shift between the different operation modes and is engaged to the wheel mechanism through the cable assembly. The handlebar mechanism uses two levers that are pushed and pulled by the user in order to shift between the different operation modes.

14 Claims, 9 Drawing Sheets

SAFETY BRAKING SYSTEM FOR A HAND-PUSHED ROLLATOR

The current application is a nonprovisional application and claims a priority to the U.S. provisional patent application Ser. No. 61/393,973 filed on Oct. 18, 2010 and U.S. provisional patent application Ser. No. 61/513,940 filed on Aug. 1, 2011.

FIELD OF THE INVENTION

The present invention generally relates to a safety braking system for a hand pushed wheeled rollator providing three modes of operation. The three modes of operation are a park mode for preventing the wheels from rotating, a walk mode for pushing the rollator, and a brake mode for slowing the rollator. For each wheel, the braking system incorporates a brake device that moves through three positions corresponding to the modes of operation. For each handlebar, the braking system incorporates a lower lever and an upper lever. The brake device is moved through the three modes of operation with a single cable by using the lower lever and the upper lever. As the user grips the lower lever, the return spring force is overcome and the braking system goes from park mode to walk mode. When the walk mode is reached, an upper lever stop holds the lower lever in walk mode. In walk mode, the lower lever can be gripped and rotated further to activate brake mode in order to decelerate the rollator. When the lower lever is released, the return spring moves the braking system back into walk mode. To return to park mode, the user presses on the upper lever. The upper lever and the stop are rotated and, thus, release the lower lever. The return spring moves the braking system back into park mode.

BACKGROUND OF THE INVENTION

Traditionally, most rollators use a braking system for safety and control. There are several types of breaking systems that are currently in use, which include two mode braking systems such as the ones shown in U.S. Pat. Nos. 4,322,093, 4,384,714, and 6,877,519.

One type of two mode braking system has a brake mode and a walk mode. This system is configured much like a simple bicycle brake. A handlebar-mounted brake lever pulls a cable that applies a friction brake to some portion of the wheel assembly during brake mode. When the brake lever is released, a spring releases the friction brake, and the braking system returns to walk mode. In another type of two mode braking system, a handlebar-mounted brake lever pulls a cable to disengage the brake. The brake is typically a positive brake, such as a gear or pin, and a slot device at the wheel. A spring returns this system into the park mode.

Some rollators also employ a three mode braking system such as the one shown in Japanese patent application No. 2006109877, which usually has a park mode, a walk mode, and a brake mode. A handlebar-mounted brake lever is moved upward to pull a cable that applies a friction brake to some portion of the wheel assembly for the brake mode. A spring returns these systems from brake mode to walk mode. For park mode, the same handlebar-mounted brake lever moved downward in order to tightly lock the friction brake against some portion of the wheel assembly. The lower lever is moved upward in order to unlock the friction brake from park mode and to return to walk mode.

All of the braking systems that are mentioned above have different disadvantages, which depends on how the braking system is being applied. Obviously, the disadvantage of the two mode braking system is that they only have two modes of operation, which could cause safety and convenience issues. Without a brake mode, the rollator could be difficult to control and possibly unsafe. Without a park mode, the rollator could move when someone is preparing to sit on it, or the rollator could roll away if left unattended on an incline. Other potential safety issues could also arise from using a two mode braking system.

The three mode braking system describe above also has disadvantages, which primarily stem from the spring returning the braking system to walk mode instead of park mode. The user has to remember to set the parking brake. If user forgets to set the parking brake, then the rollator could unintentionally move or roll away from the user. Typically, the parking brake compresses the tire and locks the wheel in place with a great deal of effort from the user, which is inconvenient for the user. In addition, if the tire is worn down and/or the cable is stressed enough, the park brake may become inoperative and may require unnecessary maintenance for the rollator.

SUMMARY OF THE INVENTION

The objective of the present invention is to solve the disadvantages of the braking systems mentioned above.

The present invention is a safety braking system for a hand pushed wheeled rollator providing three modes of operation. The three modes of operations are a park mode for preventing the wheels from rotating, a walk mode for pushing the rollator, and a brake mode for slowing or stopping the rollator. The primary advantages of the present invention are that the user does not have to remember to set the parking brake before sitting on the rollator. Consequently, the tires are not worn out and the cable is not stretched by applying the parking brake.

The present invention provides a handlebar mechanism with a lower lever that is attached to the wheel mechanism through a cable assembly. The wheel mechanism has features that lock the wheel in park mode, allows the wheel to rotate in walk mode, and applies a friction brake on the wheel in brake mode.

In order to shift from park mode to walk mode, the user pulls on the lower lever, which rotates the lower lever, pulls the cable, and disengages the parking brake. Once the parking brake is disengaged, the present invention is in walk mode. Simultaneously, the upper lever spring rotates the stop on the upper lever in order to engage the stop on the lower lever, which holds the present invention in walk mode when the lower lever is released by the user. In order to activate brake mode, the user pulls on the lower lever harder, which rotates the lower lever further and pulls on the cable further. When the lower lever is released by the user, the return spring returns the present invention to walk mode. When the switch is pushed down, the stop is disengaged and the return spring returns the present invention to park mode.

With the present invention, the return spring will always move the parking brake into park mode when the user chooses to do so. Consequently, if the tire is worn down or if the cable is stretched out, the parking brake will remain unaffected. In addition, when the user goes to sit on the rollator, the user will face away from the rollator, will brace themselves on the handlebars in a reward position, and will lower themselves onto the seat of the rollator. The switch is positioned on the handlebars in such a way that the user will press the switch while bracing the handlebars in a reward position and, thus, will engage the parking brake.

DETAIL DESCRIPTIONS OF THE INVENTION

All illustrations of the drawings are for the purpose of describing selected versions of the present invention and are not intended to limit the scope of the present invention.

Figure 1:
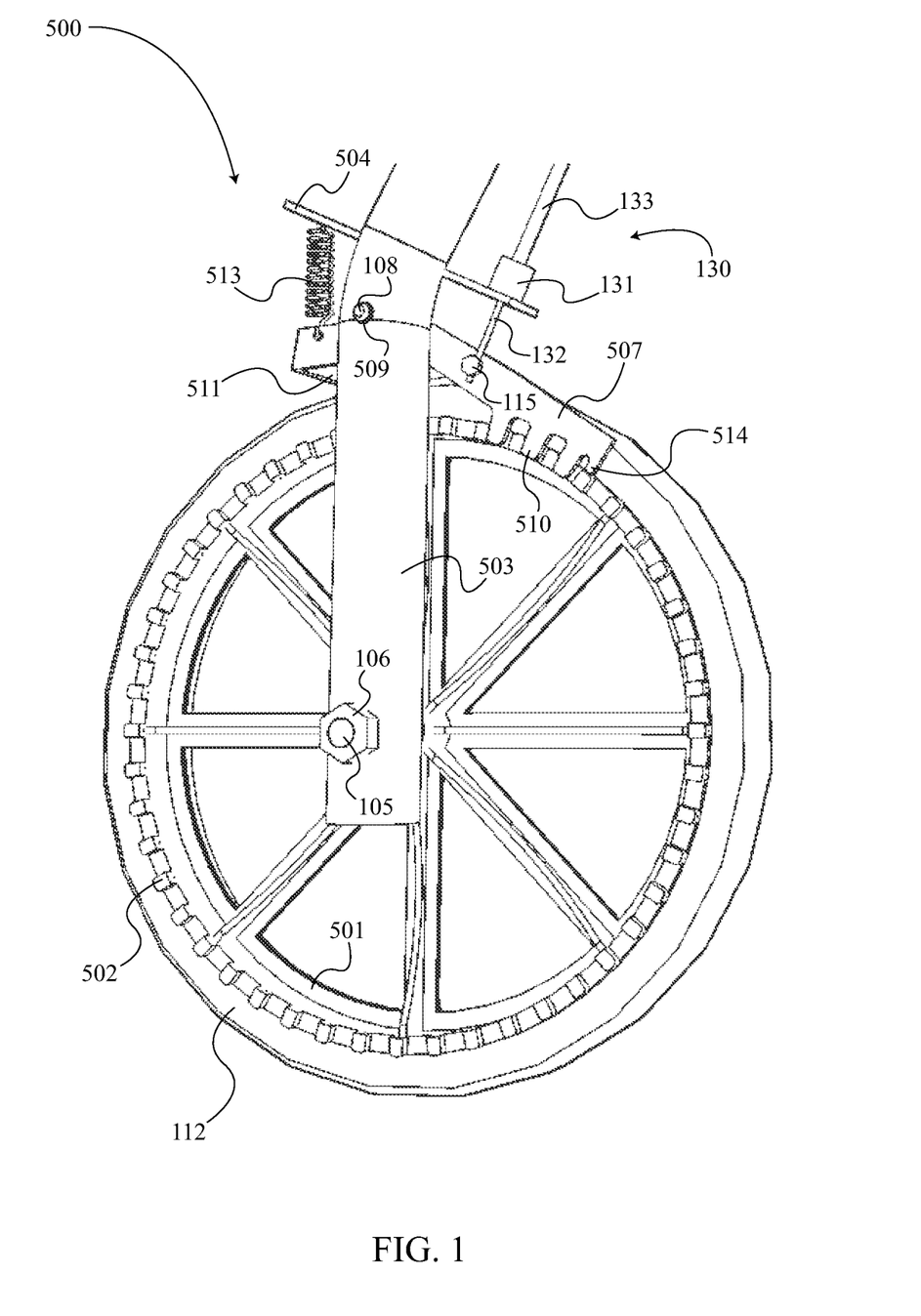
FIG. 1 is a perspective view of the present invention's wheel mechanism.

FIG. 1 shows the wheel mechanism 500 in its preferred embodiment, which comprises a wheel 501, a plurality of wheel teeth 502, a frame 503, an extension 504, an axle 105, an axle nut 106, a brake arm 507, an arm pin 108, an arm nut 509, a plurality of arm teeth 510, a friction brake 511, a tire 112, a brake system return spring 513, a stop 514, and a cable retainer 115. The wheel 501 is mounted to the frame 503 by the axle 105 and axle nut 106 so that the wheel 501 is free to rotate. The wheel 501 has a plurality of wheel teeth 502 that is concentrically connected around the wheel 501. The tire 112 encircles and is mounted onto the wheel 501. The brake arm 507 has an arm pin 108 that is mounted to pivot in the frame 503 and is secured by an arm nut 509. One side of the brake arm 507 has a plurality of arm teeth 510 that can mesh with the plurality of wheel teeth 502 on the wheel 501 in order to provide a positive locking park mode. The plurality of wheel teeth 502 are open at the bottom in order to prevent any debris from clogging and causing reduced engagement. The plurality of arm teeth 510 have ample clearance from the tip of each of the plurality of wheel teeth 502 at the engaged position to prevent any debris from clogging and causing reduced engagement. The stop 514 is connected and positioned on the brake arm 507 to maintain this ample clearance. The present invention allows for substantial backlash or clearance in between each of the plurality of wheel teeth 502 for the same purpose. The other side of the brake arm 507 is configured to form a friction brake 511 to contact the tire 112. The cable wire 132 in the cable assembly 130 is attached to the brake arm 507 adjacent to the plurality of arm teeth 510 with the cable retainer 115. The first cable ferrule 131 is retained by the extension 504 from the frame 503. The brake system return spring 513 is attached to the brake arm 507 adjacent to the friction brake 511. The other end of the brake system return spring 513 is attached to the extension 504 from the frame 503.

An alternative design for the brake arm 507, usually with a yoke mounted to the frame 503 supporting the wheel 501, can be employed with a plurality of wheel teeth 502 on both sides of the wheel 501 and with two rows of arm teeth on the a brake arm 507 straddling the wheel 501. There are many different kinds of springs that can be used as the brake system return spring 513. The brake system return spring 513 could also be an extension spring like the one shown in FIGS. 1, 2, 3, 4, 6, and 12. The brake system return spring 513 could also be a compression spring so that its force is applied to the opposite side of the brake arm 507. Another kind of brake system return spring 513 is a torsion spring that could be applied at the pivot point of the brake arm 507. Additional types of springs, such as leaf springs, could also be applied. The wheel 501 and tire 112 can be molded in engineered plastic. The frame 503 and the brake arm 507 can be fabricated from steel or aluminum. The brake system return spring 513 could be made from metal, elastomer, or other materials. Standard components can be used for most other parts.

Figure 2:
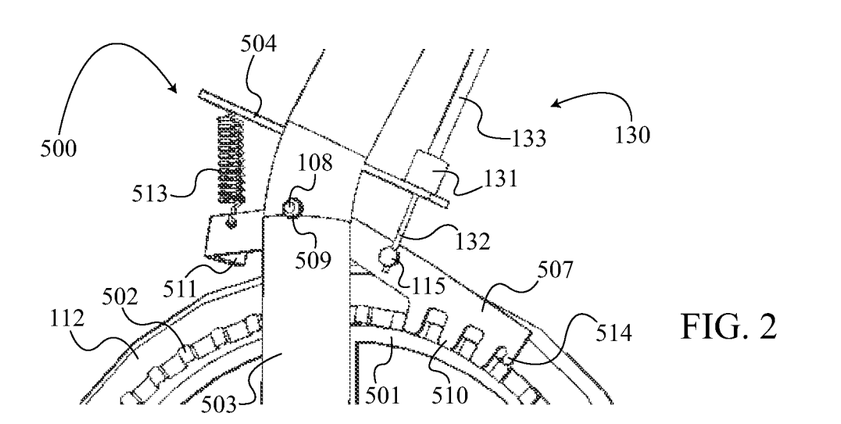
FIG. 2 is a perspective view of the present invention's wheel mechanism in park mode.
Figure 3:
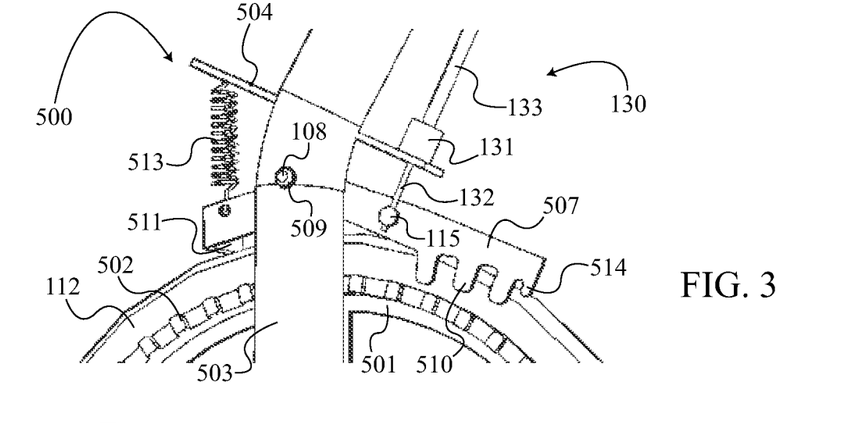
FIG. 3 is a perspective view of the present invention's wheel mechanism in walk mode.
Figure 4:
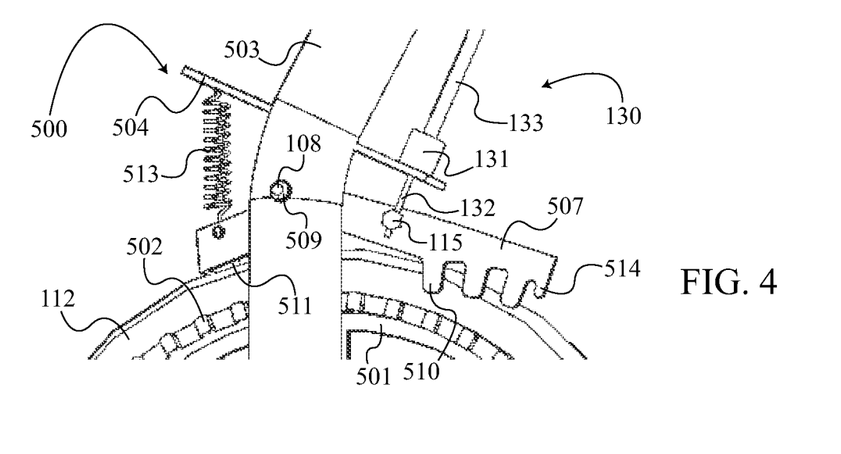
FIG. 4 is a perspective view of the present invention's wheel mechanism in brake mode.

FIGS. 2, 3, and 4 show how the brake arm 507 rotates through the park, walk, and brake modes of the wheel mechanism 500 in the preferred embodiment. The brake system return spring 513 applies a force to return the wheel mechanism 500 to walk mode or to park mode. The user can apply a force to the cable to overcome the force of the brake system return spring 513 and rotate the wheel mechanism 500 to walk mode or to brake mode. Park mode is shown in FIG. 2, where the plurality of arm teeth 510 are engaged to the plurality of wheel teeth 502 in order to prevent the wheel 501 from rotating. Walk mode is shown in FIG. 3, where the brake arm 507 is rotated so that the plurality of arm teeth 510 and the plurality of wheel teeth 502 are no longer engaged, but the friction brake 511 has not yet contacted the tire 112. Brake mode is shown in FIG. 4, where the brake arm 507 is rotated so the friction brake 511 contacts the tire 112 in order to slow down the rollator.

Figure 13:
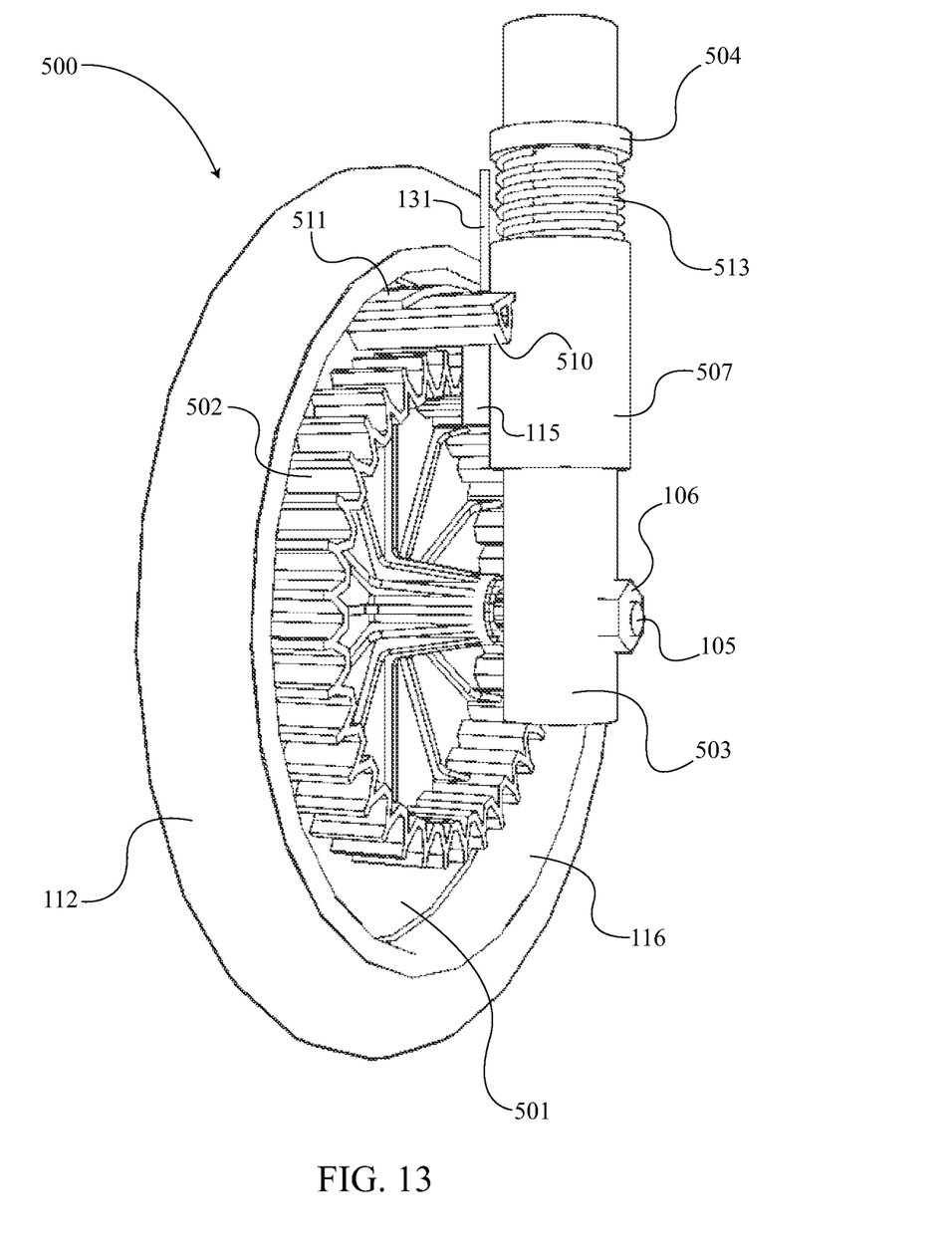
FIG. 13 is a perspective view of another embodiment of the present invention's wheel mechanism.

In FIG. 13, the wheel mechanism 500 and its components are shown in another embodiment, but the wheel mechanism 500 still serves the same purpose. The wheel 501 is still mounted to the frame 503 by the axle 105 and axle nut 106 and is free to rotate. The plurality of wheel teeth 502 are radially positioned around the axle 105 and perpendicularly connected to the wheel 501. A rim 116 encircles the wheel 501 and is also perpendicularly connected to the wheel 501. For this embodiment, the tire 112 attached around the rim 116. Also in this embodiment, the brake arm 507 is shaped like a tube and encircles the frame 503 so that it can slide along the frame 503. The brake arm 507 could also be mounted on another sliding surface attached to the frame 503. The plurality of arm teeth 510 and the friction brake 511 are positioned in between the rim 116 and the plurality of wheel teeth 502, where the plurality of arm teeth 510 can mesh with the plurality of wheel teeth 502 for park mode and the friction brake 511 can make contact with the rim 116 for brake mode. The plurality of arm teeth 510 and the friction brake 511 are perpendicularly connected to the brake arm 507 in this embodiment of the wheel mechanism 500. When the plurality of arm teeth 510 and the friction brake 511 are held in between the rim 116 and the plurality of wheel teeth 502 by brake arm 507, the wheel mechanism 500 is in walk mode. The brake system return spring 513 or any other elastic device is located on the frame 503 with one end reacting to the brake arm 507 and the other end reacting to the extension 504 from the frame 503, which provides a force to return the brake arm 507 to the park mode. The cable wire 132 is attached to the brake arm 507 through the first cable ferrule 131. As the cable wire 132 is pulled, the cable wire 132 slides the brake arm 507 through the positions based on the actions taken by the user at the handlebar mechanism 750. In this embodiment of the wheel mechanism 500, the wheel 501 and brake arm 507 can be molded in engineered plastic, and the friction brake 511 can be molded or cut from sheet rubber or plastic with high friction properties.

Figure 5:
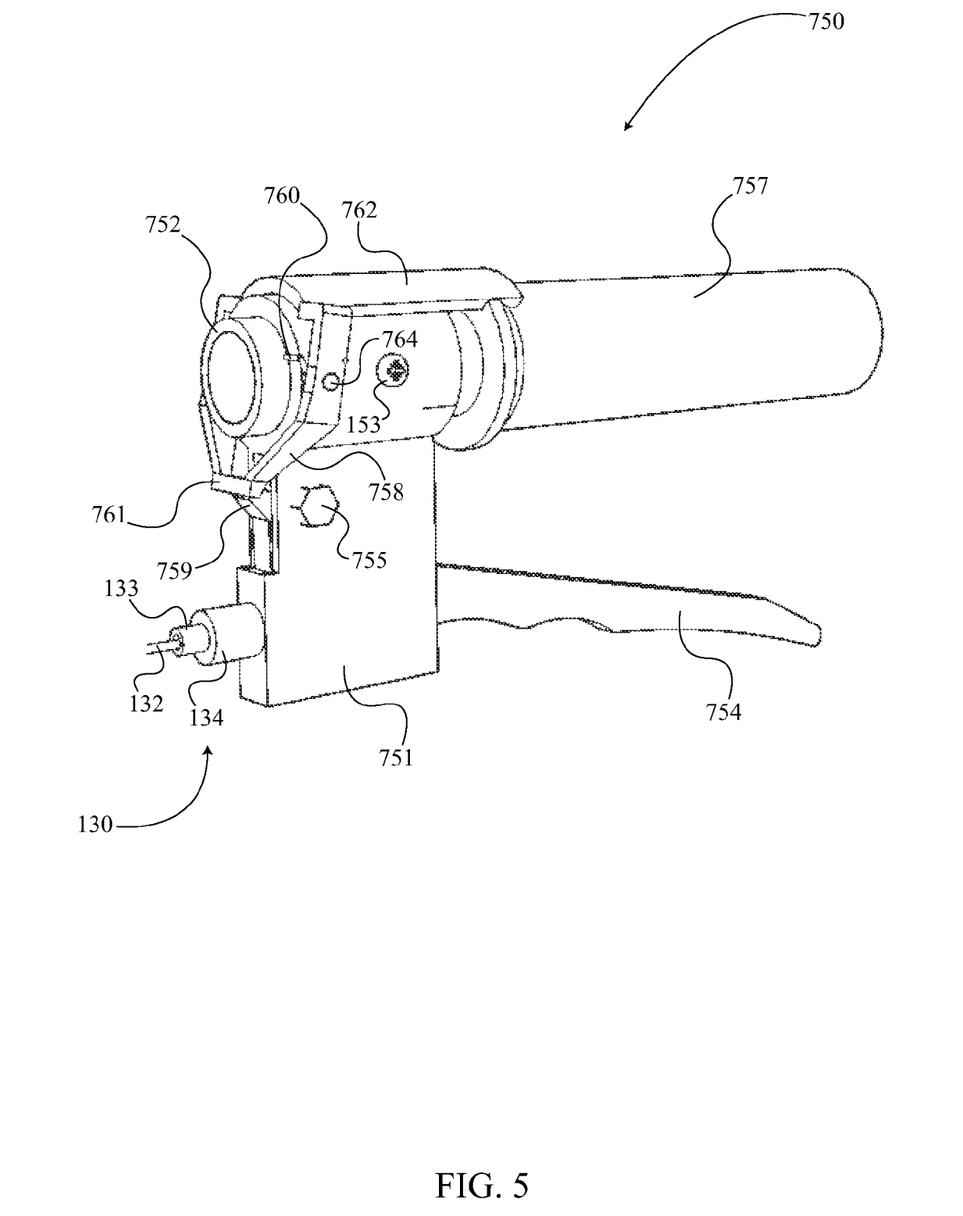
FIG. 5 is a perspective view of the present invention's handlebar mechanism.

The handlebar mechanism 750 for the present invention is shown in FIG. 5 and comprises a lever housing 751, a handlebar 752, a screw 153, a lower lever 754, a pivot fastener 755, a grip 757, an upper lever 758, a switch 762, a lower lever stop 759, an upper lever spring 760, an upper lever stop 761, and a pair of lever pins 764. The lever housing 751 is attached to the outside of handlebar 752 with the screw 153. The lower lever 754 is mounted inside the lever housing 751 and pivots about the pivot fastener 755. A pivot fastener 755 is used to secure the lower lever 754 into the lever housing 751. The lower lever 754 has a lower lever stop 759, which juts out of the opposite side of the lever housing 751. The upper lever 758 pivots on the pair of lever pins 764 that is part of lever housing 751. The upper lever 758 has a switch 762, which is positioned along the handlebar 752, and an upper lever stop 761, which is positioned opposite of the switch 762 on the upper lever 758. The upper lever spring 760 is shown as a torsion spring in FIGS. 5, 6, 7, 8, 9, 10, and 11. The upper lever spring 760 is attached to the lever housing 751 and the upper lever 758 in such a way that the upper lever spring 760 rotates the switch 762 upward and the upper lever stop 761 rearward. The grip 757 is attached around the handlebar 752 adjacent to the lever housing 751. The handlebar mechanism 750 needs two levers and a spring, but can be configured in many different ways. The upper lever spring 760 can be a torsion spring, an extension 504 spring, or any other type of spring. The upper lever spring 760 and the upper lever 758 could be mounted with different pins, screws, snap fits, etc. The cable assembly 130 is mounted in the lever housing 751 with a second cable ferrule 134, which allows the cable wire 132 to be attached to the lower lever 754. The cable housing 133 protects and guides the cable wire 132 from the first cable ferrule 131 to the second cable ferrule 134. The lower lever 754 pulls the cable wire 132 as the lower lever 754 is rotated upwards.

Figure 6:
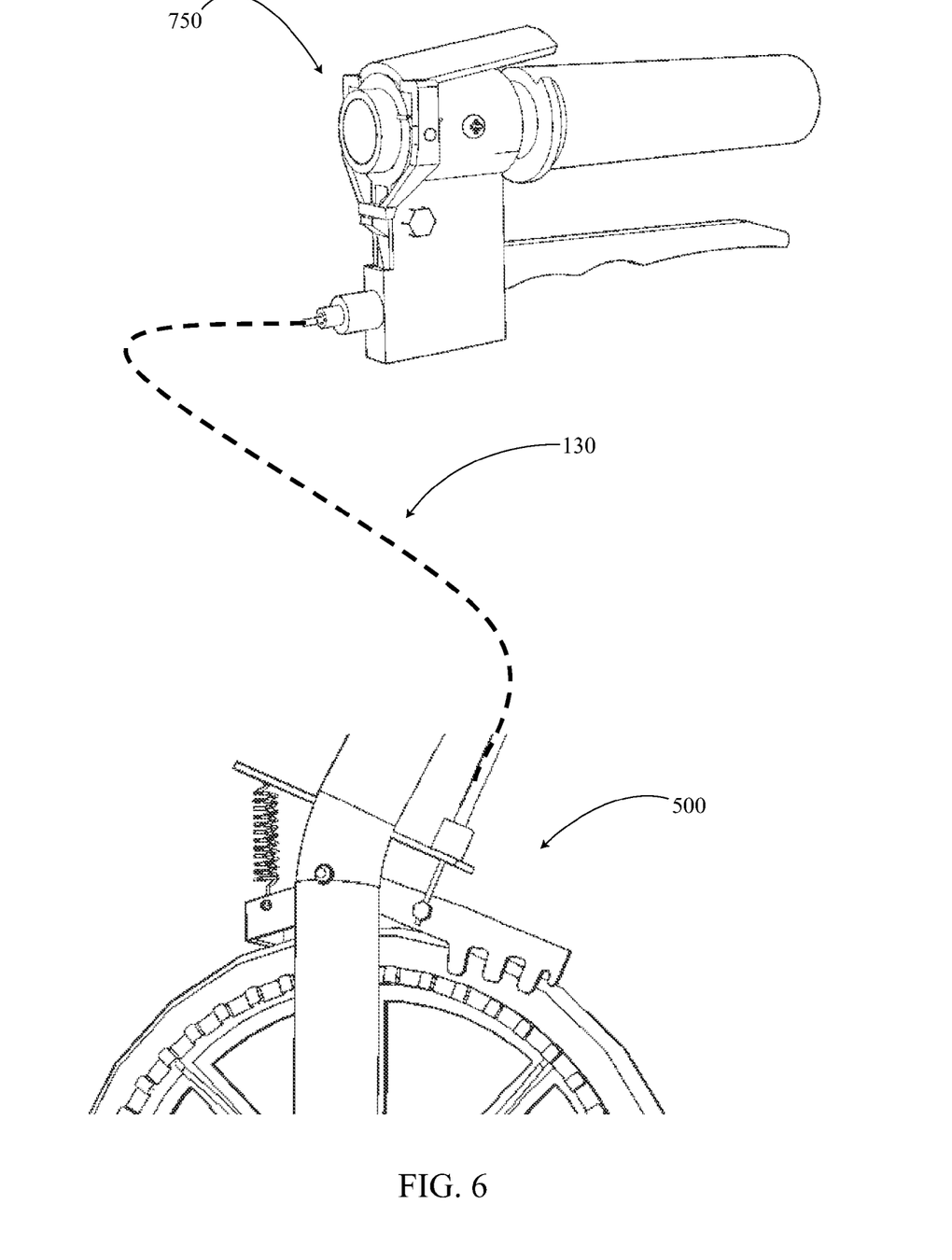
FIG. 6 is a schematic of the present invention.

The lever housing 751 and lower lever 754 can be easily manufactured from plastic or metal. The screw 153, the pivot fastener 755, the grip 757, and the cable assembly 130 can be standard components. FIG. 6 illustrates the present invention in its entirety, which is the handlebar mechanism 750 connected to the wheel mechanism 500 by the cable assembly 130.

Figure 7:
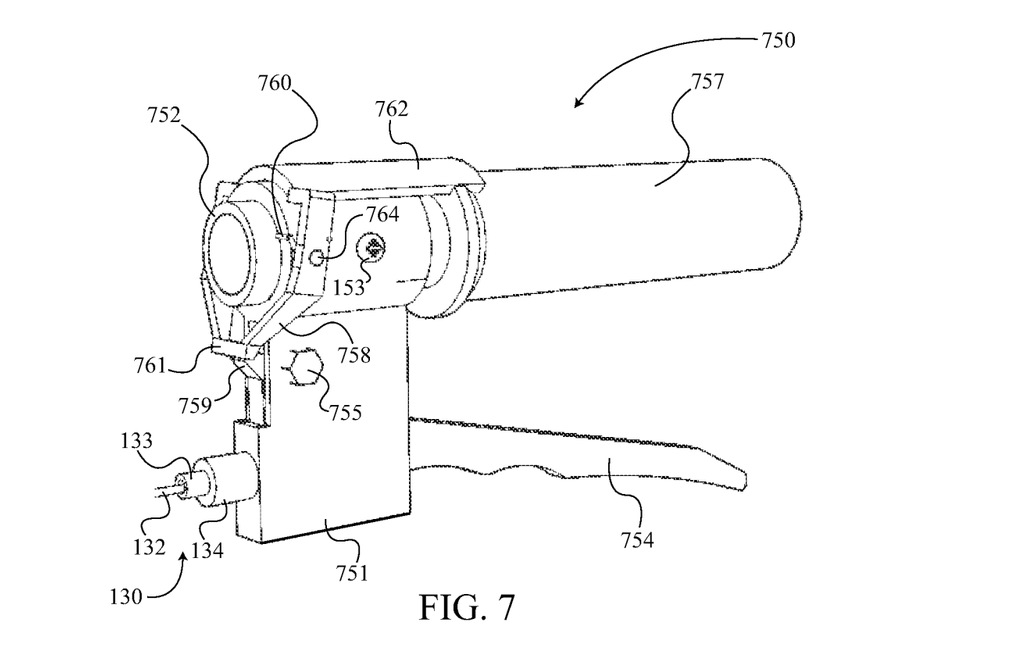
FIG. 7 is a perspective view of the present invention's handlebar mechanism in park mode.
Figure 8:
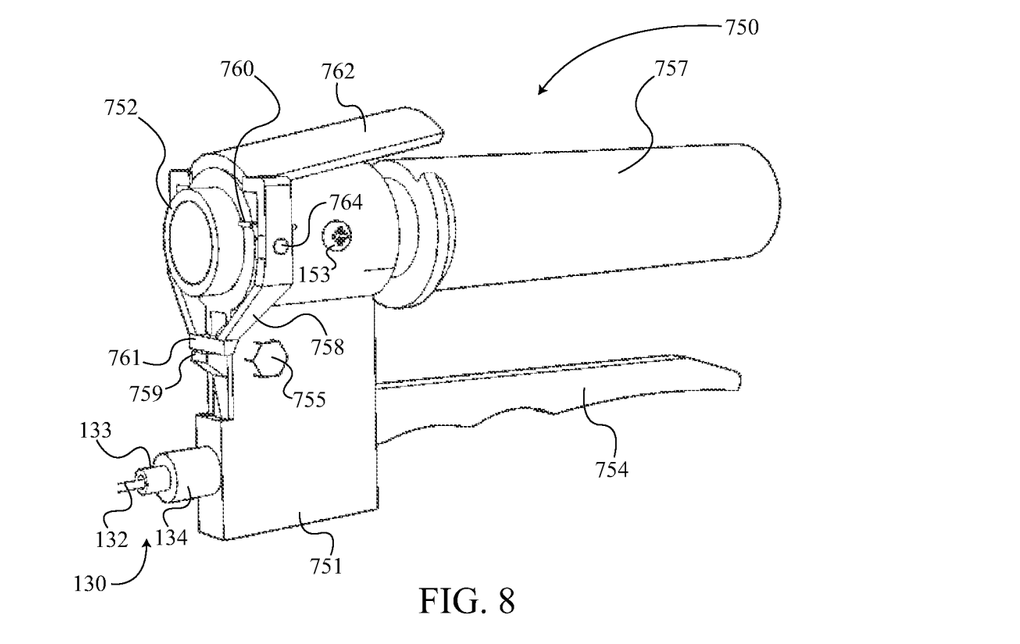
FIG. 8 is a perspective view of the present invention's handlebar mechanism in walk mode.
Figure 9:
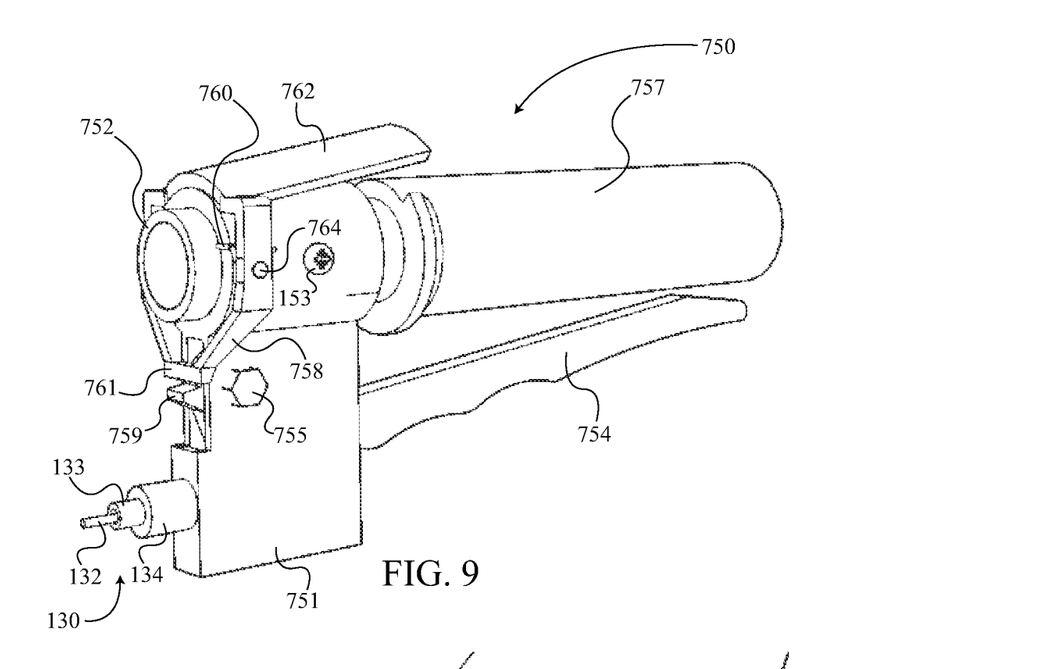
FIG. 9 is a perspective view of the present invention's handlebar mechanism in brake mode.

FIGS. 7, 8, and 9 show how the handlebar mechanism 750 is positioned during the different modes of operation. FIG. 7 shows the handlebar mechanism 750 in park mode, where the switch 762 is rotated down by the user and correspondingly rotates the upper lever stop 761 forward. As a result, the upper lever stop 761 disengages from the lower lever stop 759 so that the lower lever 754 is free to rotate down, which is pulled by the brake system return spring 513 through the cable assembly 130. Consequently, the brake arm 507 is held by the brake system return spring 513 in the park mode position, which can be seen in FIG. 2, and the plurality of arm teeth 510 is engaged to the plurality of wheel teeth 502. This positive locking effect provides a secure park mode, where the rollator wheels are not able to rotate. In order to walk with the rollator, the user grips the lower lever 754 of the handlebar mechanism 750 applying an upward force rotating the lower lever 754 as shown in FIG. 8. As shown in FIG. 3, when the plurality of arm teeth 510 are disengaged from the plurality of wheel teeth 502 but the friction brake 511 has not rotated far enough to contact the tire 112, the wheel mechanism 500 is in walk mode. As the lower lever 754 is moved to the walk position, the switch 762 is rotated upward by the upper level spring 760 through the upper lever 758. The upper lever stop 761 is rotated rearward into a position above the lower lever stop 759 by the upper level spring 760 through the upper lever 758, which prevents the lower lever 754 from returning to the park mode. The present invention is now able to maintain walk mode without any grip 757 force from the user. In order to employ the brake mode, the user applies additional upward force on the lower lever 754 as shown in FIG. 9, which rotates the brake arm 507 through the cable assembly 130 so that the friction brake 511 makes contact with the tire 112 as can be seen in FIG. 4. The braking force applied to the tire 112 is proportional to the upward force applied to the lower lever 754 by the user.

In order to return to the walk mode, the user releases the lower lever 754, which is shown in FIG. 8. Consequently, the brake system return spring 513 applies the necessary force to return the wheel mechanism 500 to walk mode as can be seen in FIG. 3.

In order to return to the park mode, the user presses the switch 762 down, which rotates the upper lever stop 761 forward and releases the lower lever stop 759. The brake system return spring 513 applies a downward force through the cable assembly 130 on the lower lever 754, which rotates the lower lever 754 to the position shown in FIG. 7 and causes the brake arm 507 to move into the park position shown in FIG. 2.

Figure 10:
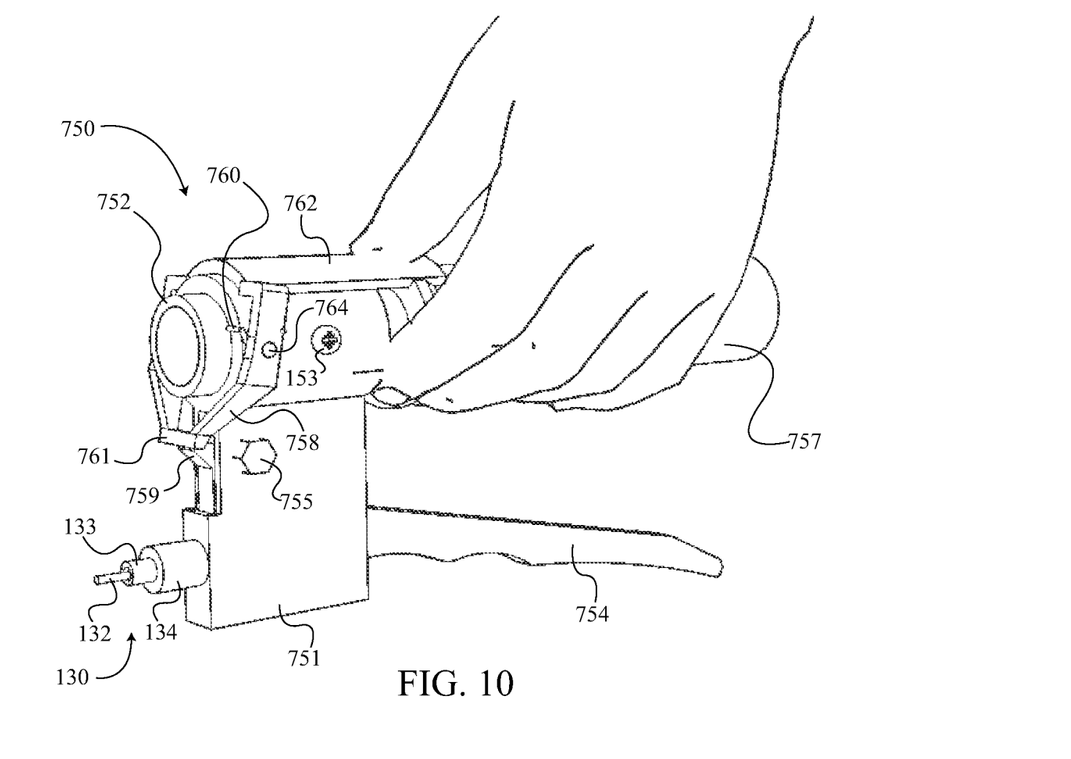
FIG. 10 is a perspective view of the present invention's handlebar mechanism in park mode with a hand facing forward.
Figure 11:
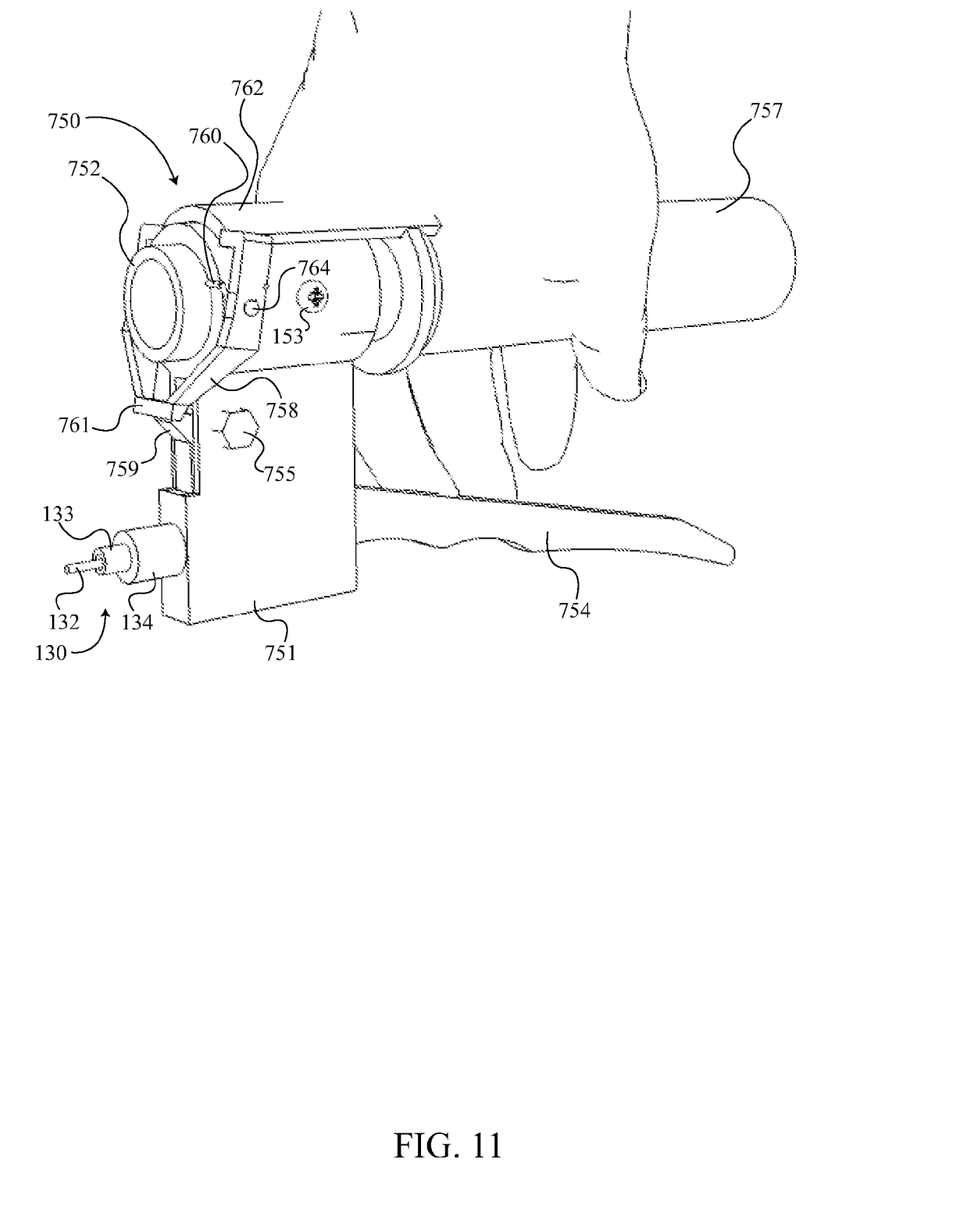
FIG. 11 is a perspective view of the present invention's handlebar mechanism in park mode with a hand facing rearward.

The configuration and location of the switch 762 provides two ways to activate park mode. First, the normal forward walking hand position, which is shown in FIG. 10, allows the user to simply press down on the switch 762 with their thumb to activate park mode. Second, when a user goes to sit in the rollator, the user grasps the handlebar 752 with a rearward hand position, which is shown in FIG. 11, in order to brace and lower him/herself into the rollator for a seat. The position of the switch 762 on the upper lever 758 allows the user to easily engage the parking brake because the user supports him/herself with the rollator near this position. Thus, the location of the switch 762 on the rollator becomes an important safety issue because the user can only sit on the rollator when the parking brake is engaged.

Figure 12:
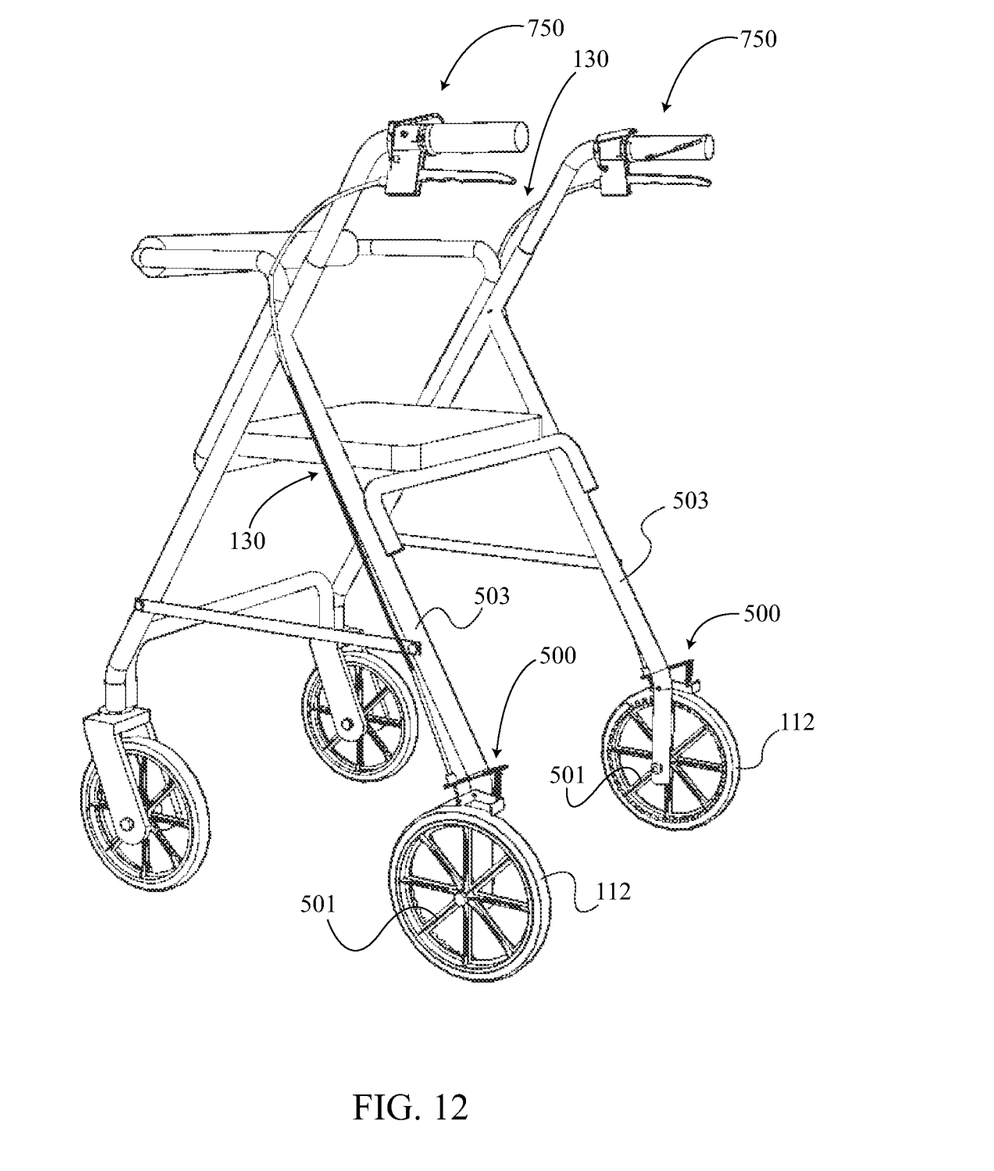
FIG. 12 is a perspective view of the present invention installed on the rollator.

FIG. 12 depicts how the present invention is installed on a rollator and how the handlebar mechanism 750 and the wheel mechanism 500 in the preferred embodiment are used. The handlebar mechanism 750 and the wheel mechanism 500 are connected by the cable assembly 130 that is routed along the rollator.

Although the invention has been explained in relation to its preferred embodiment, it is to be understood that many other possible modifications and variations can be made without departing from the spirit and scope of the invention as hereinafter claimed.

What is claimed is:

1. A safety braking system for a hand-pushed rollator comprises,
   a wheel mechanism;
   a cable assembly;
   a handle bar mechanism;
   said wheel mechanism comprises a wheel, a plurality of wheel teeth, a frame, an extension, an axle, an axle nut, a brake arm, an arm pin, an arm nut, a plurality of arm teeth, a friction brake, a tire, a brake system return spring, a stop, and a cable retainer;
   said cable assembly comprises a first cable ferrule, a second cable ferrule, a cable wire, and a cable housing;
   said handle bar mechanism comprises a lever housing, a handlebar, a screw, a lower lever, a pivot fastener, a grip, an upper lever, a switch, a lower lever stop, an upper lever spring, an upper lever stop, and a pair of lever pins;
   said frame being positioned adjacent to said wheel;
   said axle being perpendicularly connected to said frame;

said wheel being rotatably attached to said axle with said axle nut;

said arm pin being positioned above said wheel and being perpendicularly connected to said frame;

said brake arm being pivotally attached to said arm pin with said arm nut;

said extension being positioned above said brake arm and being connected to said frame;

said lever housing being perpendicularly traversed through by said handlebar;

said lever housing being attached to said handlebar with said screw;

said handlebar being encircled and attached to said grip;

said grip being positioned adjacent to said lever housing along said handlebar;

said lower lever being inserted into by said lever housing;

said lower lever being pivotally attached to said lever housing by said pivot fastener;

said lower lever stop jutting out of said lever housing opposite to said lower lever and adjacent to said handlebar;

said lower lever stop being connected adjacent to said lower lever within said lever housing;

said upper lever being positioned around said handlebar and said lever housing;

said upper lever being pivotally attached to said handlebar and said lever housing with said pair of lever pins;

said upper lever spring being attached to said upper lever and said lever housing;

said switch being positioned along said handlebar;

said switch being connected adjacent to said upper lever;

said upper lever stop being connected to said upper lever opposite to said switch; and said lower lever stop being positioned adjacent to said upper lever stop; and said plurality of arm teeth being perpendicularly connected to said brake arm adjacent to said arm pin.

2. The safety braking system for a hand-pushed rollator as claimed in claim 1 comprises, said plurality of wheel teeth being radially positioned around said axle and being perpendicularly connected to said wheel adjacent to said frame;

said wheel being encircled by and attached to said tire;

said stop being perpendicularly connected to said brake arm adjacent to said plurality of arm teeth; and said friction brake being perpendicularly connected to said brake arm and being positioned adjacent to said arm pin opposite of said plurality of arm teeth.

3. The safety braking system for a hand-pushed rollator as claimed in claim 2 comprises, said plurality of arm teeth being positioned adjacent to said plurality of wheel teeth;

said friction brake being positioned adjacent to said tire;

said brake system return spring being attached to said brake arm adjacent to friction brake;

said extension being attached to said brake system return spring opposite of said brake arm;

said first cable ferrule being connected and positioned on said extension opposite said brake system return spring; and said first cable ferrule being traversed through by said cable wire and being attached to said brake arm adjacent to said plurality of arm teeth with said cable retainer.

4. The safety braking system for a hand-pushed rollator as claimed in claim 1 comprises, said second cable ferrule being connected to said lever housing opposite to said lower lever;

said second cable ferrule being traversed through by said cable wire;

said lever housing being traversed into by said cable wire; and said cable wire being attached to said lower lever.

5. The safety braking system for a hand-pushed rollator as claimed in claim 1 comprises, said cable wire being encircled by said cable housing between said first cable ferrule and said second cable ferrule.

6. A safety braking system for a hand-pushed rollator comprises, a wheel mechanism;

a cable assembly;

a handle bar mechanism;

said wheel mechanism comprises a wheel, a rim, a plurality of wheel teeth, a frame, an extension, an axle, an axle nut, a brake arm, a plurality of arm teeth, a friction brake, a tire, and a brake system return spring;

said cable assembly comprises a first cable ferrule, a second cable ferrule, a cable wire, and a cable housing;

said handle bar mechanism comprises a lever housing, a handlebar, a screw, a lower lever, a pivot fastener, a grip, an upper lever, a switch, a lower lever stop, an upper lever spring, an upper lever stop, and a pair of lever pins;

said lever housing being perpendicularly traversed through by said handlebar;

said lever housing being attached to said handlebar with said screw;

said handlebar being encircled and attached to said grip; and said grip being positioned adjacent to said lever housing along said handlebar; and said friction brake and said plurality of arm teeth being perpendicularly connected to said brake arm.

7. The safety braking system for a hand-pushed rollator as claimed in claim 6 comprises, said plurality of wheel teeth being radially positioned around said axle;

said plurality of wheel teeth being encircled by said rim;

said rim being encircled by and attached to said tire;

said wheel being connected adjacent to said plurality of wheel teeth and to said rim;

said frame being positioned adjacent to said plurality of wheel teeth and said rim opposite to said wheel;

said axle being perpendicularly connected to said frame;

said wheel being rotatably attached to said axle with said axle nut;

said frame being encircled by said brake arm adjacent to said axle;

said frame being encircled by said brake system return spring;

said brake system return spring being positioned adjacent to said brake arm opposite of said axle;

said frame being encircled and connected to said extension;

said extension being positioned adjacent to said brake system return spring opposite of said brake arm;

said friction brake being positioned in between said rim and said plurality of wheel teeth;

said plurality of arm teeth being connected to said friction brake adjacent to said plurality of wheel teeth;

said first cable ferrule being connected to said brake arm; and said cable wire being traversing through said first cable ferrule and being connected to said brake arm.

8. The safety braking system for a hand-pushed rollator as claimed in claim 6 comprises,
  said lower lever being inserted into by said lever housing;
  said lower lever being pivotally attached to said lever housing by said pivot fastener;
  said lower lever stop jutting out of said lever housing opposite to said lower lever and adjacent to said handlebar; and
  said lower lever stop being connected adjacent to said lower lever within said lever housing.

9. The safety braking system for a hand-pushed rollator as claimed in claim 8 comprises,
  said upper lever being positioned around said handlebar and said lever housing;
  said upper lever being pivotally attached to said handlebar and said lever housing with said pair of lever pins;
  said upper lever spring being attached to said upper lever and said lever housing;
  said switch being positioned along said handlebar;
  said switch being connected adjacent to said upper lever;
  said upper lever stop being connected to said upper lever opposite to said switch; and
  said lower lever stop being positioned adjacent to said upper lever stop.

10. The safety braking system for a hand-pushed rollator as claimed in claim 8 comprises,
  said second cable ferrule being connected to said lever housing opposite to said lower lever;
  said second cable ferrule being traversed through by said cable wire;
  said lever housing being traversed into by said cable wire; and
  said cable wire being attached to said lower lever.

11. The safety braking system for a hand-pushed rollator as claimed in claim 6 comprises,
  said cable wire being encircled by said cable housing between said first cable ferrule and said second cable ferrule.

12. A safety braking system for a hand-pushed rollator comprises,
  a wheel mechanism;
  a cable assembly;
  a handle bar mechanism;
  said wheel mechanism comprises a wheel, a plurality of wheel teeth, a frame, an extension, an axle, an axle nut, a brake arm, an arm pin, an arm nut, a plurality of arm teeth, a friction brake, a tire, a brake system return spring, a stop, and a cable retainer;
  said cable assembly comprises a first cable ferrule, a second cable ferrule, a cable wire, and a cable housing;
  said handle bar mechanism comprises a lever housing, a handlebar, a screw, a lower lever, a pivot fastener, a grip, an upper lever, a switch, a lower lever stop, an upper lever spring, an upper lever stop, and a pair of lever pins;
  said frame being positioned adjacent to said wheel;
  said axle being perpendicularly connected to said frame;
  said wheel being rotatably attached to said axle with said axle nut;
  said arm pin being positioned above said wheel and being perpendicularly connected to said frame;
  said brake arm being pivotally attached to said arm pin with said arm nut;
  said extension being positioned above said brake arm and being connected to said frame;
  said lever housing being perpendicularly traversed through by said handlebar;
  said lever housing being attached to said handlebar with said screw;
  said handlebar being encircled and attached to said grip;
  said grip being positioned adjacent to said lever housing along said handlebar;
  said cable wire being encircled by said cable housing between said first cable ferrule and said second cable ferrule; and said plurality of arm teeth being perpendicularly connected to said brake arm adjacent to said arm pin.

13. The safety braking system for a hand-pushed rollator as claimed in claim 12 comprises,
  said plurality of wheel teeth being radially positioned around said axle and being perpendicularly connected to said wheel adjacent to said frame;
  said wheel being encircled by and attached to said tire;
  said stop being perpendicularly connected to said brake arm adjacent to said plurality of arm teeth;
  said friction brake being perpendicularly connected to said brake arm and being positioned adjacent to said arm pin opposite of said plurality of arm teeth;
  said plurality of arm teeth being positioned adjacent to said plurality of wheel teeth;
  said friction brake being positioned adjacent to said tire;
  said brake system return spring being attached to said brake arm adjacent to friction brake;
  said extension being attached to said brake system return spring opposite of said brake arm;
  said first cable ferrule being connected and positioned on said extension opposite said brake system return spring; and
  said first cable ferrule being traversed through by said cable wire and being attached to said brake arm adjacent to said plurality of arm teeth with said cable retainer.

14. The safety braking system for a hand-pushed rollator as claimed in claim 12 comprises,
  said lower lever being inserted into by said lever housing;
  said lower lever being pivotally attached to said lever housing by said pivot fastener;
  said lower lever stop jutting out of said lever housing opposite to said lower lever and adjacent to said handlebar;
  said lower lever stop being connected adjacent to said lower lever within said lever housing;
  said upper lever being positioned around said handlebar and said lever housing;
  said upper lever being pivotally attached to said handlebar and said lever housing with said pair of lever pins;
  said upper lever spring being attached to said upper lever and said lever housing;
  said switch being positioned along said handlebar;
  said switch being connected adjacent to said upper lever;
  said upper lever stop being connected to said upper lever opposite to said switch;
  said lower lever stop being positioned adjacent to said upper lever stop;
  said second cable ferrule being connected to said lever housing opposite to said lower lever;
  said second cable ferrule being traversed through by said cable wire;
  said lever housing being traversed into by said cable wire; and
  said cable wire being attached to said lower lever.

\* \* \* \* \*